United States Patent
Zwilling et al.

(10) Patent No.: US 6,249,792 B1
(45) Date of Patent: Jun. 19, 2001

(54) ON-LINE DYNAMIC FILE SHRINK FACILITY

(75) Inventors: Michael Zwilling, Redmond; Rande Blackman, Seattle; Sameet Agarwal, Redmond; Steven J. Lindell, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/212,661

(22) Filed: Dec. 16, 1998

(51) Int. Cl.$^7$ .................................................. G06F 12/00
(52) U.S. Cl. ................. 707/205; 707/200; 707/201; 707/202; 707/203; 707/204; 707/206
(58) Field of Search ..................... 707/200, 201, 707/202, 203, 204, 205, 206; 711/153, 164; 712/23

(56) References Cited

U.S. PATENT DOCUMENTS

| | | | |
|---|---|---|---|
| 5,987,580 | * 11/1999 | Jasuja et al. | 711/170 |
| 6,049,854 | * 4/2000 | Bedarida | 711/153 |
| 6,065,020 | * 5/2000 | Dussud | 707/206 |

OTHER PUBLICATIONS

Rezaei et al. "A new implementation technique for memory management" by the Univ. of Alabama, pp. 332–339, (IEEE publication), Apr. 2000.*

Srisa–an et al. "Scalable hardware–algorithm for mark–sweep garbage collection" by dept. of Computer Science, Illinois Instit. of tech., pp. 274–281., vol. (IEEE publication), Sep. 2000.*

Yang "Space and time efficient BDD construction via working set control" by Computer Science Dept., Carnegie Mellon University, pp. 423–432, (IEEE publication0, Feb. 1998.*

* cited by examiner

*Primary Examiner*—Thomas Black
*Assistant Examiner*—Diane D. Mizrahi
(74) *Attorney, Agent, or Firm*—Woodcock Washburn Kurtz Mackiewicz & Norris LLP

(57) ABSTRACT

An on-line dynamic shrink facility sets an allocation fence in a file and moves data from above the fence to below the fence. The fence is based on a target size for the file. When all the data above the fence is moved below the fence, the space above the fence is freed. The target size can be a specified size, an original size for the file when it was created, or a size calculated by examining the amount of space used and adding in an amount of desired free space. Resources that are required to move the data, such as old and new allocation units for the data, or that will be impacted by movement of the data, such as index entries, are locked or latched to prevent corruption of the data while it is being moved. The operations are performed in discreet transactions which are immediately committed to minimize the impact on other users of the file.

21 Claims, 7 Drawing Sheets

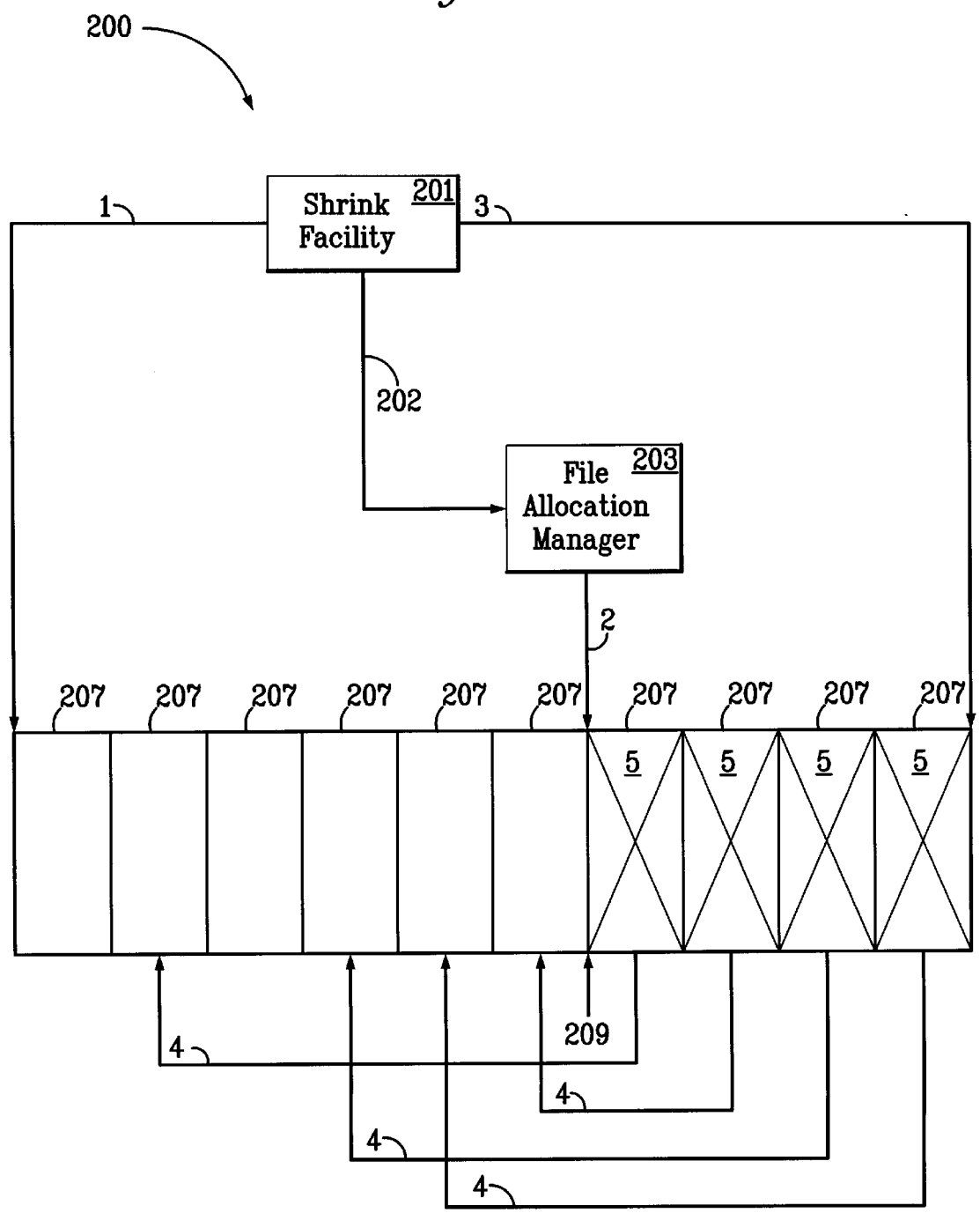

ON-LINE DYNAMIC FILE SHRINK FACILITY

FIELD OF THE INVENTION

This invention relates generally to data management, and more particularly to shrinking the size of a data file.

COPYRIGHT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1997, Microsoft Corporation, All Rights Reserved.

BACKGROUND OF THE INVENTION

Many data management systems allow the size of a data file to grow as the amount of data stored in the file increases beyond its initial allocated size. In most systems, the file is logically subdivided into pages which are addressed by multiplying the page number by the page size. Increasing the size of a file is a simple operation as new pages are appended to the end of the file.

On the other hand, deletions from the file mean that the file size is larger than is required to hold its data. Unfortunately, reducing the size of a file is difficult since deletions usually occur randomly throughout the file. While it is possible to move data from one page to another to fill the holes in the file left by deletion, changing the physical location of a page within the file requires that the page number be modified. Therefore, shrinking a file's size has previously required unloading the file, deleting and recreating the file, and reloading the data. All of these operations must be performed when there are no database users present to prevent corrupted data. Preventing user access to the database during the shrinking process can range from merely inconvenient, in the case of a small file, to highly disruptive.

Therefore, there is a need in the art for a mechanism to reduce the physical size of a data file while the data in the file is being read and updated by on-line users

SUMMARY OF THE INVENTION

The above-mentioned shortcomings, disadvantages and problems are addressed by the present invention, which will be understood by reading and studying the following specification.

An on-line dynamic shrink facility sets an allocation fence in a file and moves data from above the fence to below the fence. The fence is based on a target size for the file. When all the data above the fence is moved below the fence, the space above the fence is freed. The target size can be a specified size, an original size for the file when it was created, or a size calculated by examining the amount of space used and adding in an amount of desired free space. Resources that are required to move the data, such as old and new allocation units for the data, or that will be impacted by movement of the data, such as index entries, are locked or latched to prevent corruption of the data while it is being moved. The operations are performed in discreet transactions which are immediately committed to minimize the impact on other users of the file.

The shrink can be manually initiated by a user and/or automatically checked and run by a background process when certain pre-defined conditions are satisfied. Alternatively, the shrink can be initiated through a scheduling facility.

Because the fence acts as an end-of-file marker while the data is being moved, data added by other users will be placed below the fence, so the shrinking has little, if any, affect on those users. Because the shrinking facility transactions hold resources for a very short time, user that need to access the data being moved also experience minimal disruption of their processing. Finally, because the shrink facility can be automatically initiated in response to changing conditions in the file, the shrinking is dynamic and operates when necessary.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 2 is a diagram illustrating a system-level overview of an exemplary embodiment of the invention;

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular relational database implementation of the invention is described. Finally, in the fifth section, a conclusion of the detailed description is provided.

Hardware and Operating Environment

Figure 1:
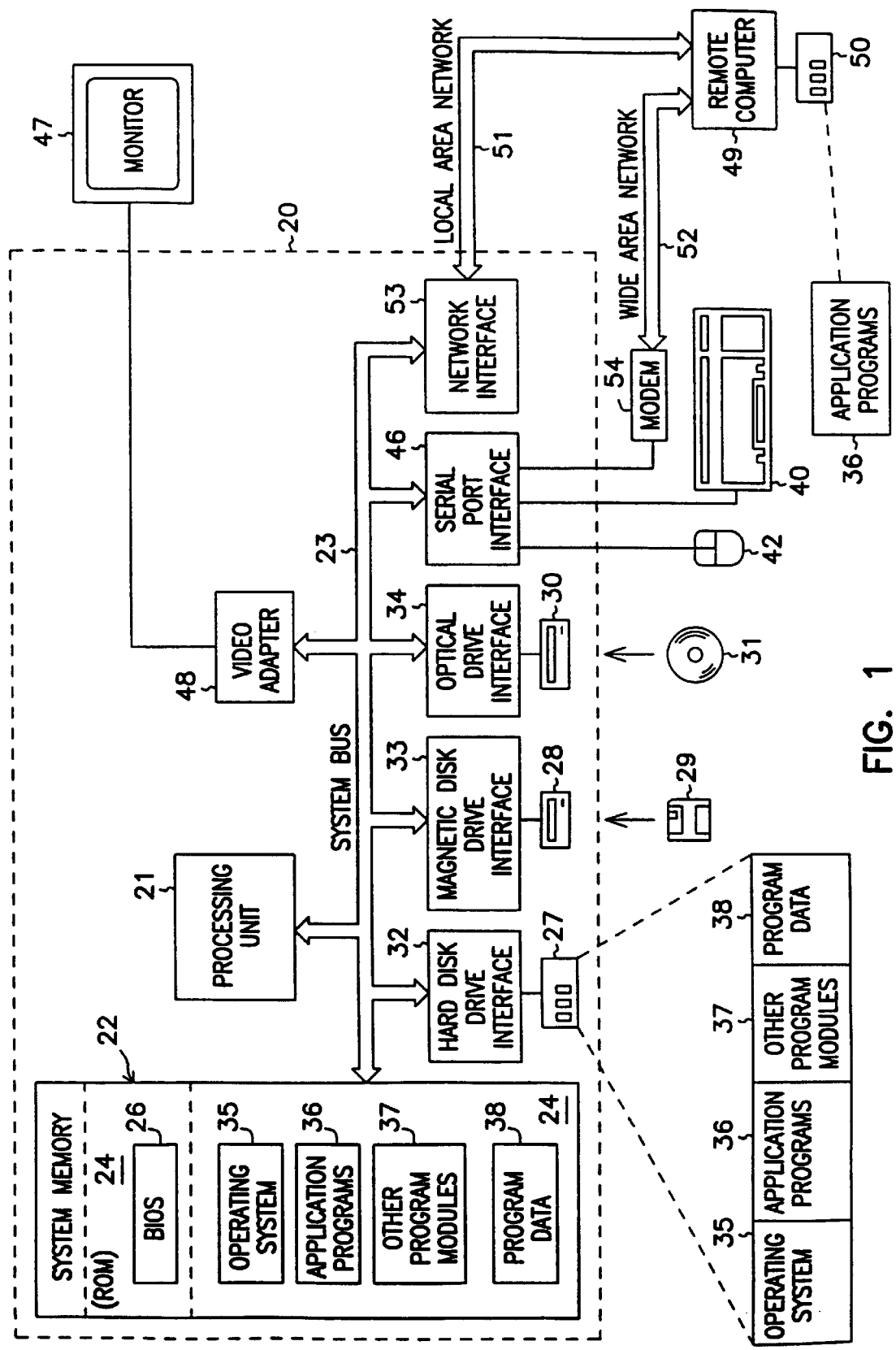
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

A system level overview of the operation of an exemplary embodiment of the invention is described by reference to FIG. 2. An on-line dynamic file shrink facility 201 operates as part of a data management system 200. A file allocation manager 203 in the data management system 200 allocates and deallocates allocation units 207 in a data file 205. An interface 202 between the shrink facility 201 and the file allocation manager 203 is represented by a double arrow; the actions performed by the shrink facility 201 and the file allocation manager 203 are illustrated as numbered single arrows. The shrink facility 201 is described as a software program which executes in the CPU of a computer, such as computer 20 in FIG. 1. In an instance in which the remote computer 49 is acting as a file server to a client computer, the shrink facility executes on the remote computer 49. The file 205 resides on any writeable mass storage device, such as hard disk 29.

When the file 205 is to be reduced in size, the shrink facility 201 scans the file 205 from its start, or head, to its end, or tail (action 1). The shrink facility 201 examines each allocation unit 207 to determine if it is used or empty. When the tail of the file 207 is reached, the shrink facility 201 calculates the amount of data in the file based on the number of used allocation units 207. The target size of the file 207 is estimated using the amount of data in the file and a desired amount of free space, if any is specified. In an alternate embodiment, the target size of the file 207 is estimated to be the size of the file when it was originally created. In still another alternate embodiment, the target size is estimated to be the smaller of the original size or the amount of data plus any desired free space. The address of the tail of the estimated target size file is designated as an "allocation size fence" 209.

The shrink facility 201 passes the fence address 209 to the file allocation manager 203. The file allocation manager 203 is responsible for ensuring that no additional allocation units are allocated above the fence 209 (action 2) until the shrinking process is completed, except as discussed below.

The shrink facility 201 scans the allocation units 207 starting at the tail of the file until it reaches the fence 209 (action 3). If an allocation unit 207 above the fence is used, the shrink facility 201 calls the file allocation manager 203 to allocate a unit below the fence. The shrink facility 201 moves the data in the used allocation unit to the allocation unit below the fence (action 4) and calls the allocation manager 203 to de-allocate the allocation unit 207 above the fence. If an allocation unit 207 above the fence is empty, the shrink facility 201 calls the file allocation manager 203 to deallocate the allocation unit (action 5 as illustrated by X-ing out the empty allocation units). When the shrink facility 201 reaches the fence 209, the shrinking process is complete. In an alternate embodiment, the shrink facility 201 causes the file allocation manager 203 to deallocate each empty allocation unit during the first scan (action 1) so only used allocation units 207 above the fence 209 must be deallocated during the second scan (action 3).

Because the shrinking process is dynamic, a user can add information to the file as it is being reduced in size. If the additional information cannot fit in the amount of free space below the fence 209, the file allocation manager 203 moves the fence to a higher address in the file to accommodate the new data.

If the file 205 is a "flat file" in that data in the file is not logically inter-related, the movement of the data from the allocation units 207 above the fence 209 to allocation units 207 below the fence 209, only the data in the allocation unit is affected by the move. On the other hand, if the file 205 contains structured data, such as that found in relational data base or index sequential files, additional processing is required to maintain the logical relationships among the data items in the file. The type of data structure dictates the processes required. For example, if the data to be moved represents an index record, any pointers to the "to-be-moved" index record that are contained in other index records must be updated with the new address.

A user cannot be allowed access to data in an allocation unit 207 above the fence 209 while the file allocation manager 203 is moving the data. Depending on the type of data, the shrink facility 201 either locks or latches the allocation unit until the data is moved. Such locks and latches are well-known in file systems that support a multi-user concurrent operating environment. The details of the various moving processes are described in the next section.

The on-line dynamic shrink facility as described above executes whenever a pre-determined set of criteria is met in the file system environment. In particular, this on-demand shrink process is designed to be triggered following periods of highest allocation/deallocation activity in the file system.

As one of skill in the art will immediately appreciate, the shrink process can also be invoked at other times, through either manual or automated procedures. For purposes of illustration, three exemplary embodiments of automatic shrinking are next described. In all cases, a check to determine if a shrink is required, based on a pre-defined autoshrink policy, is performed. Such a pre-defined policy includes the amount of free space in the file that is allowed before a shrink is activated and the minimum size for the final file. Additionally, only files which are marked as "autoshrink" are affected by the automatic shrink embodiments.

The first automatic shrink embodiment is an "agent" process that executes on-line and implements the autoshrink policy and a schedule for a file. The schedule includes execution when a CPU idle timer reaches a pre-determined value or at a pre-set time and allows the shrink process to be run at idle or off peak times to minimize the impact on interactive users.

The second automatic shrink embodiment shrinks the file upon startup. In this exemplary embodiment, a command to run the shrink process is performed as the last command in the startup procedure.

The third embodiment is a utility program that schedules the shrink process as part of various file system maintenance tasks. The utility is triggered by certain events, such as system startup or excess free space, or in accordance with a predetermined schedule. After performing the shrink process on the appropriate files, the utility "sleeps" until a time or event triggers it again.

The system level overview of the operation of an exemplary embodiment of the invention has been described in this section of the detailed description. An on-line dynamic shrink facility estimates a new, smaller size for a file and rearranges the data in the existing file to fit within the boundaries of the new size. The shrink process can be triggered by file system conditions or can be scheduled. While the invention is not limited to any particular configuration of components, for sake of clarity, the shrink facility has been described as operating in conjunction with a file allocation manager which performs functions requested by the shrink facility.

Methods of an Exemplary Embodiment of the Invention

In the previous section, a system level overview of the operation of an exemplary embodiment of the on-line dynamic shrink facility was described. In this section, the particular methods performed by the computer executing such an exemplary embodiment are described by reference to a series of flowcharts. The methods to be performed constitute computer programs made up of computer-executable instructions. Describing the methods by reference to a flowchart enables one skilled in the art to develop such programs including such instructions to carry out the methods on suitable computers (the processor of the clients executing the instructions from computer-readable media).

Referring to FIGS. 3A–F a flowchart of a method to be performed by a computer according to an exemplary embodiment of the invention is shown. This method is inclusive of the acts required to be performed by either a client or a server computer. The term "page" is used to refer the file allocation unit in describing the flowchart but the invention is not limited to only files which are divided into pages as will be described in detail in the next section.

The shrink facility begins by determining the target size of the file. The file is scanned, counting the free and allocated pages (block 301 in FIG. 3A). These counts are used to estimate the target size to which the file can be reduced to maintain the requested free space after the shrink (block 303). The estimate is "fuzzy" as the file is still in use by other users who can cause the allocation manager to allocate or deallocating space in the file. The size of the file specified at its creation is the minimum target size allowed for the file (block 307). This is to prevent the file from excessively growing and shrinking with all user operations and also prevents new files from shrinking before they can be loaded with data. In an alternate embodiment shown in phantom in FIG. 3, a size specified when the shrink is initiated is used as the target size (block 302).

In a further embodiment, the shrink facility also deallocates any pages and extents in the file that are empty and not locked to increase the amount of space freed up by the shrink facility. The deallocation can be performed as part of block 301 or prior to the processing represented by blocks 301 or 302.

Once the target size is determined, the allocation size fence address corresponding to the target size is stored in a data structure used by the allocation manager for the particular file (block 309). As described above, this modifies the behavior of the allocation manager such that all allocations in the file will occur below the fence. Having the allocation manager enforce the fence guarantees that new space will not be allocated in the area the shrink facility is trying to deallocate and allows the shrink facility to use standard allocation manager calls. If the allocation manager runs out of space under the allocation fence while a shrink is occurring, it will raise the allocation fence to make room for the data.

A reverse scan of all the allocated pages in the file is initiated from the tail of the physical file (block 311) and is terminated when the scan hits the allocation fence in the file (block 315). Note that the fence address can change during the reverse scan if the allocation manager needs additional space. Such may occur if the target size estimate was incorrect or other users have caused allocations to be occur since the estimate was made.

Each allocated page above the fence is read to determine the type of the allocated page and the appropriate processes are performed to move the data to a page or pages below the fence (block 315). The processes for the various types of pages are illustrated in FIGS. 3B–F and described next. In most instances, the shrink facility initiates a single transaction that moves the page below the fence and updates any pointers. The transaction latches and/or locks the resources it needs to ensure proper concurrency control on the subsequent moving operations. The use of such latches and locks is a well-known concurrency control technique and the appropriate levels will be readily apparent to one skilled in the art. After it completes its moving operations, the transaction immediately commits to release the latched and/or locked resources to minimize conflicts with other processes on the system. Exceptions to the single transaction practice are noted below.

In the exemplary embodiment being described in this section, there are four types of data structures that can be stored in a file and moved by the shrink facility: heap (unordered) data records, clustered (ordered) data records, text records, and index records. Each page in the file contains only one type of data structure, also referred to as the "owing object" of the page. The process of moving each page is dependent upon the type of its owning object. In addition, the root of each index structure is pointed to by a system index data structure ("meta data") that reflects the organization of the file.

If the owning object is heap data (FIG. 3B), the data records are stored in the page in no particular order. References to a heap data record access it using a physical address for the record, such as page number and record number (also referred to as a record identifier or RID). The shrink facility deletes each data record on the page and reinserts it (block 323). Each insertion will occur below the allocation fence, thus moving the data on the page below the fence. The delete-insert process also updates any data structures, such as index records for secondary keys, that reference the moved data record. After all records have been moved from the page above the fence, it is deallocated (block 325).

In one embodiment, the shrink facility uses standard insert and delete commands provided by the underlying file system to perform the delete-insert process; in an alternate embodiment, the RIDs of the data records are passed into a special update command and the delete and insert commands are grouped to increase efficiency. Because the data records are reinserted using standard insert commands, the shrink facility relies on the operations of the underlying file system to appropriately update any referencing data structures. Note that reinsertion can scatter the data records onto different pages below the fence but since the data is not ordered, such scattering only affects the referencing data structures, if any.

If the owning object for an page is clustered data (FIG. 3C), the data records are stored on the page in order sorted on a particular, cluster, key. In the exemplary embodiment, the key values are arranged in a binary tree index in which the pages containing the data records form leaf nodes of the tree. Nodes above the leaf nodes in the binary tree comprise pages containing index records and are referred to as intermediate nodes, with the topmost node called the root node. The pages for nodes in different levels are singly linked, top to bottom, in a parent-child relationship. Pages residing at the same level of the tree are referred to as sibling nodes and are doubly-linked one to another in key order so that the intermediate index records and data records can be traversed in forward or reverse order from one sibling page to the next or previous. Thus, to find the page containing the parent index record for a particular data record, the binary tree must be scanned from root node to the lowest intermediate node before the leaf node containing the data record.

When a clustered data page needs to be moved, the shrink facility extracts the value of the cluster key from one of the data records on the page (block 331). This key value is then used to search the binary tree until the lowest intermediate parent index record is found (block 333). The search returns a pointer to the page holding the parent index record. The data records are moved to an empty page below the fence (block 335). The links in the parent and sibling pages are updated to point to the new page (block 337) and the old page is deallocated (block 339). In the exemplary embodiment, all secondary index data structures on a clustered index use the cluster key to access the data row, so the secondary indexes do not be updated when the data is moved. In an alternate embodiment (not illustrated), in which the secondary index data structures access the data record through its RID, the secondary index records are updated with the new RID for the data record.

The data records described above are small enough to fit on a page and, in most instances, multiple data records reside on a single page. In contrast, in the exemplary embodiment, text data can be too large to fit on a single page, as happens when large image files are stored. In this case, the text data is split among text records stored on multiple pages. Because these pages can be scattered throughout the file, the pages are linked together through the use of a text record binary tree structure, with the root node of the tree pointed to by a heap or clustered data record. There is no link from a text record back to its parent node or to the root node, nor are there links between sibling nodes at any level of the tree.

Figure 3A:
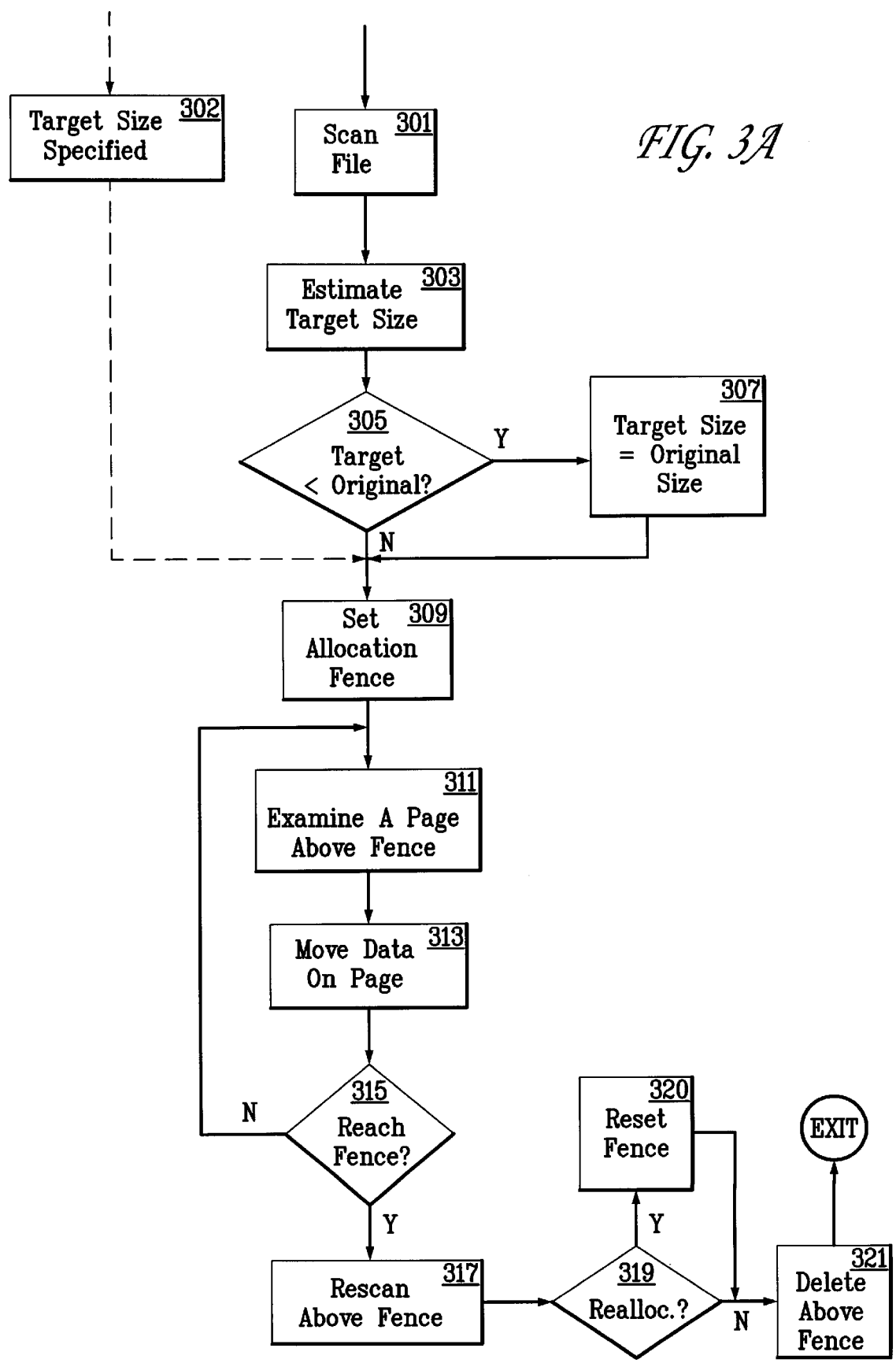
FIGS. 3A–F are a flowchart of a method to be performed by a client according to an exemplary embodiment of the invention.
Figure 3B:
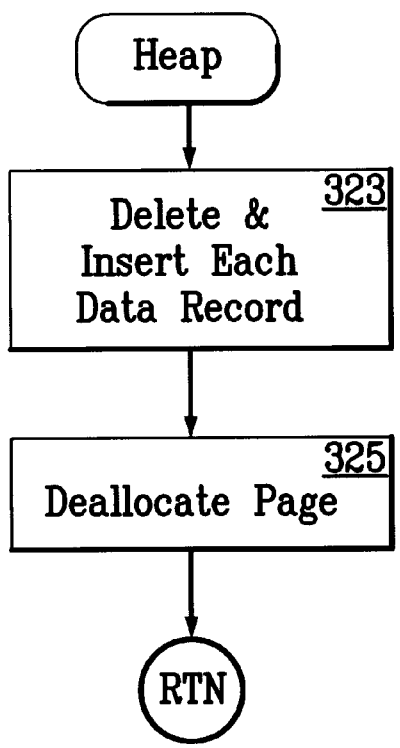
Figure 3C:
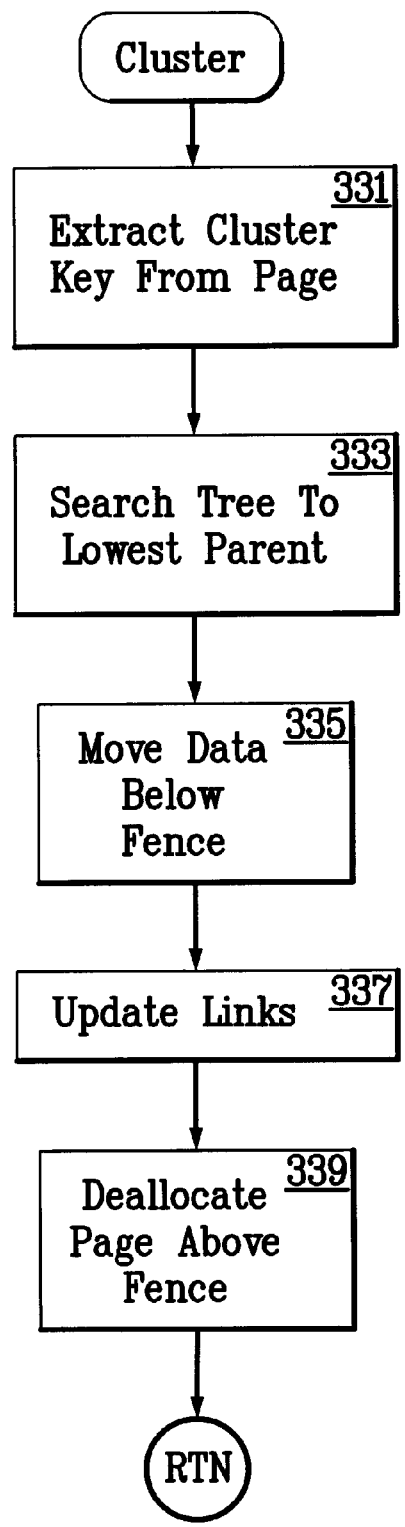
Figure 3D:
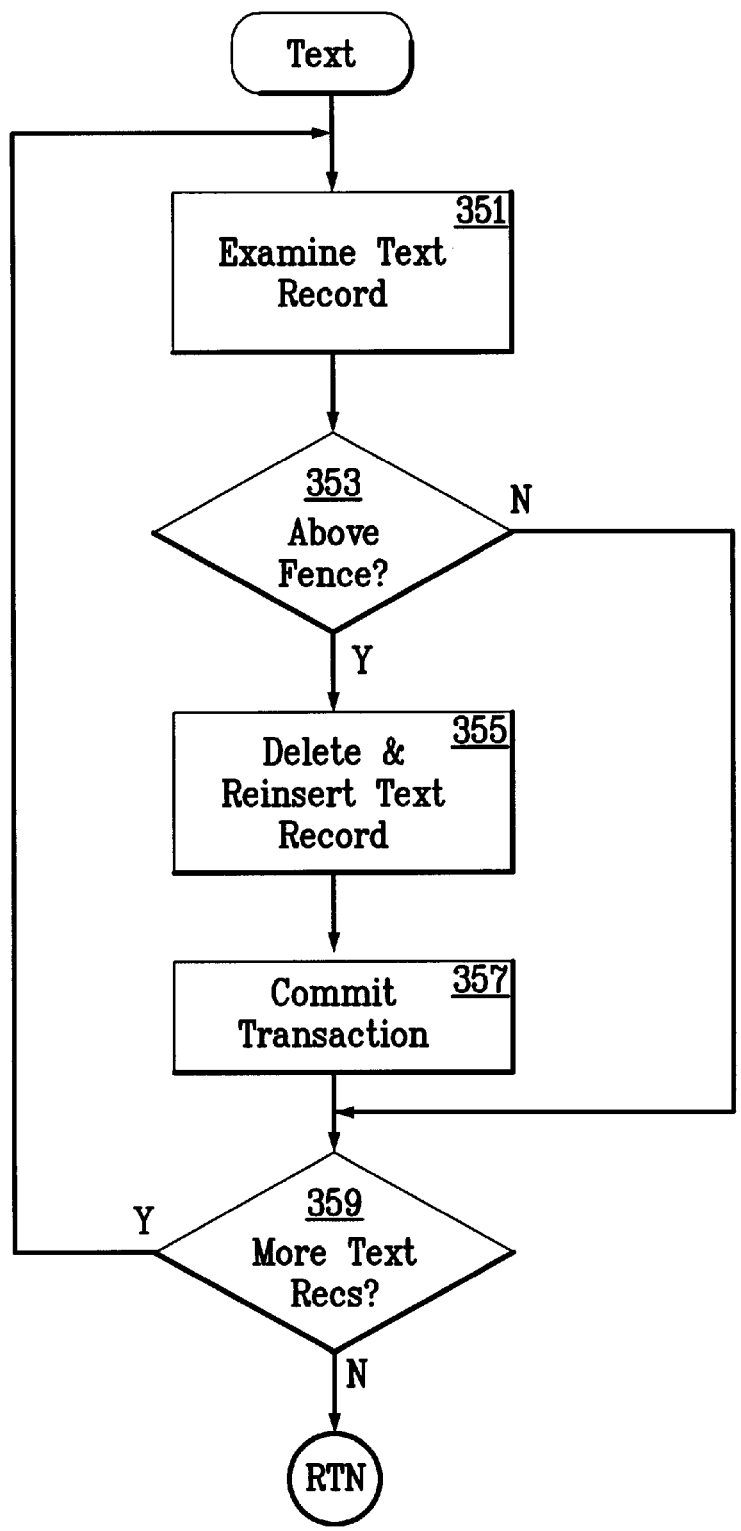
Figure 3E:
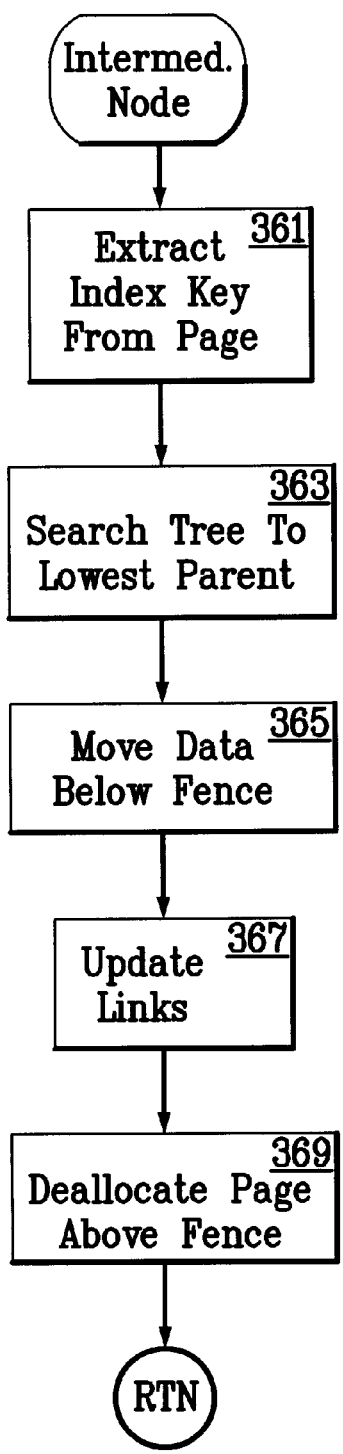
Figure 3F:
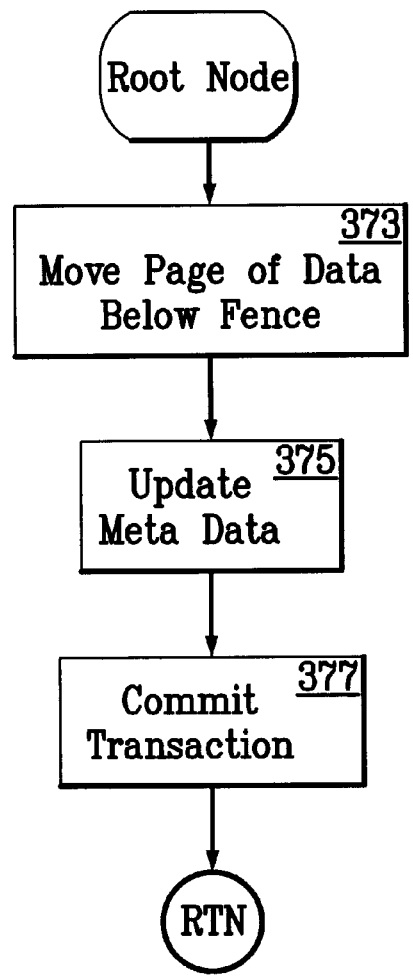

As shown in FIG. 3D, when any page owned by a text record object is first encountered above the fence, the shrink facility performs a bulk move process to move all the related pages above the fence at one time. The shrink facility uses the text record binary tree to examine each related text record (block 351). If the text records is determined to be stored on a page above the fence (block 353), the text record is deleted and reinserted (block 355). The reinsertion causes a new page to be allocated below the fence and the link to the text record to be updated in the appropriate parent node in the text record binary tree. The movement of each text record forms an intermediate transaction in the bulk move process. The intermediate transactions are committed as each completes to minimize contention for the file (block 357). In an alternate embodiment, the transaction granularity is the binary tree level rather than each text record.

If the owning object is an intermediate index node (FIG. 3E), a key value is extracted from one of the index records on the page (block 361). The binary tree is searched for the parent node in the level of the binary tree immediately above the level of the intermediate index node (block 363). The remainder of the process (blocks 365 until 371) is performed as described above in conjunction with clustered data records.

If the owning object for a page is a root node (FIG. 3F), the data is moved to an empty page below the fence (block 373), the link to the root node in the meta data is updated (block 375), and the change immediately committed (block 377).

Once the shrink facility has moved the data on each page above the fence (block 315), it re-scans all the pages above the fence to ensure that none have been reallocated (block 317). If one or more pages have been reallocated (block 319), the fence is reset to the highest reallocated page (block 321). At this point, the shrink facility calls the allocation manager to delete the empty, deallocated pages (block 323). The allocation manager updates the appropriate allocation pages and the shrink facility terminates.

The particular methods performed by client or server computer of an exemplary embodiment of the invention have been described. The method performed by the computer has been shown by reference to a flowchart including all the steps from 301 until 377.

Relational Database Implementation

In this section of the detailed description, a particular implementation of the shrink facility as used in Microsoft Corporation's SEQ Server 7.0 is described. SEQ Server 7.0 is a relational database management system in which data is stored in table (relation) objects. Each table object comprises columns (domains) and rows (tuples). Keys for sorted tables are maintained in index binary tree structures.

The data files which comprise an SEQ Server 7.0 database are divided into page and extent allocation units. Each page is categorized as a certain type, such as data (clustered or heap), text, or index, and contains the data for the corresponding type of object. A page can also contain data for objects related to the organization and management of the file itself, such as allocation information discussed in detail further below.

An extent consists of eight pages and is classified as a uniform or a mixed extent. A uniform extent contains data for only one type of object while a mixed extent can be shared by up to eight different objects. The initial allocation unit for a new table or index object is a page in a mixed extent. Once the data has grown to encompass eight pages, the allocation unit switches to a uniform extent.

The allocation of pages and extents is tracked by four types of data structures. A Global Allocation Map (GAM) is a single page in a file that records which extents have been allocated in the file. A Shared Global Allocation Map (SGAM) is a single page in the file that records which extents are classified as mixed extents and have at least one empty page. A Page Free Space (PFS) page in the file records which individual pages have been allocated and the amount of free space on the page. Index Allocation Map (IAM) pages record the extents that are used by a heap or index object. IAM pages are allocated as needed for each object in the file. The IAM pages for an object are logically linked to the object and multiple IAM pages for the same object are doubly linked together.

An SEQ Server 7.0 database contains at least a primary data file and a log file. Secondary data files can also be created for the database. The files can grow automatically from the size specified when they were created. The data files can be associated in filegroups, which permit data to be stored in any one of the related data files.

The log file consists of multiple physical files, each of which is broken up into multiple logical log files. The allocation unit for the log file is a logical record and there are multiple logical record in a logical log file. Each log record records changes to the database. SEQ Server 7.0 uses the logical log files in a round-robin manner as space is required with the use pattern not necessarily following the physical ordering of the logical files. At checkpoints or log backups, the logical files may be marked as free is no active transaction references the data in the logical file.

Locking and Latching

The shrink facility in SQL Sever 7.0 utilizes various levels of database locks and latches to ensure database consistency while maximizing concurrency through the database while the transactions which shrink the database are being processed.

Each shrink transaction is set to the lowest priority to ensure the shrink transaction is rolled back in case of deadlocks. The resources required for the transaction are determined and are latched before any actions are logged to ensure there are no rollbacks due inability to get resources once the transaction has begun its processing. Alternatively, the shrink facility attempts to lock the required resource and skips any resource which causes a conflict to minimize the impact on other users.

Exclusive table locks are required when moving the first and root pages of the index for a data table, as well as when moving the first and root IAM pages. The pages are locked and moved in a single transaction which is immediately committed to limit the time the lock is in place.

An exclusive page lock is placed on data level pages (heap and clustered). Movement of clustered data pages also requires exclusively latching the previous and next sibling pointers. In an alternate embodiment, all the pages in a uniform extent are locked/latched and moved in a single transaction to minimize the amount of time the locks/latches are held.

Exclusive page latches are set on parent nodes only while the pointers in the nodes are being updated. Intermediate index nodes latch the parent, then the page that is to be moved, and then any siblings. The latch on the parent node blocks access to its intermediate and leaf children pages. In the case of a root node, there is no parent node, so an exclusive table level lock is used to block any other access to the index.

Logging

SEQ Server 7.0 records the shrink transactions in the log file so they can be rolled back in case of a deadlock situation. An alternate embodiment that does not use the log file for rollback purposes is also described below.

All page allocation and deallocations caused by the shrink facility are logged in the log file. In one embodiment, the header and contents of the page which is moved are logged. Because the amount of data necessary to record this information could cause space problems in the log, an alternate embodiment creates a new type of logical record which records the movement of the data from the old to new pages.

Index and sibling pointer changes are recorded in the log file as a result of the normal SQL processing called by the shrink facility to effect the changes.

Because heap data rows are not sorted on the data pages, the heap rows on a page above the fence can be scattered to different pages below the fence. The content of each record so moved is recorded in the log file to ensure they are rolled back to the correct page if necessary.

If recovery of the data that is moved is not an issue, then an alternate embodiment of the shrink facility does not record the data in the log file. Instead, a single page in a mixed extent is allocated to held the required log information for the current transaction. After the transaction is complete, the page is cleared. When recovery is initiated, a special call is issued at the end of normal recovery steps that reads the log records from the page and reapplies any operations required.

Components of the Shrink Facility

Figure 4:
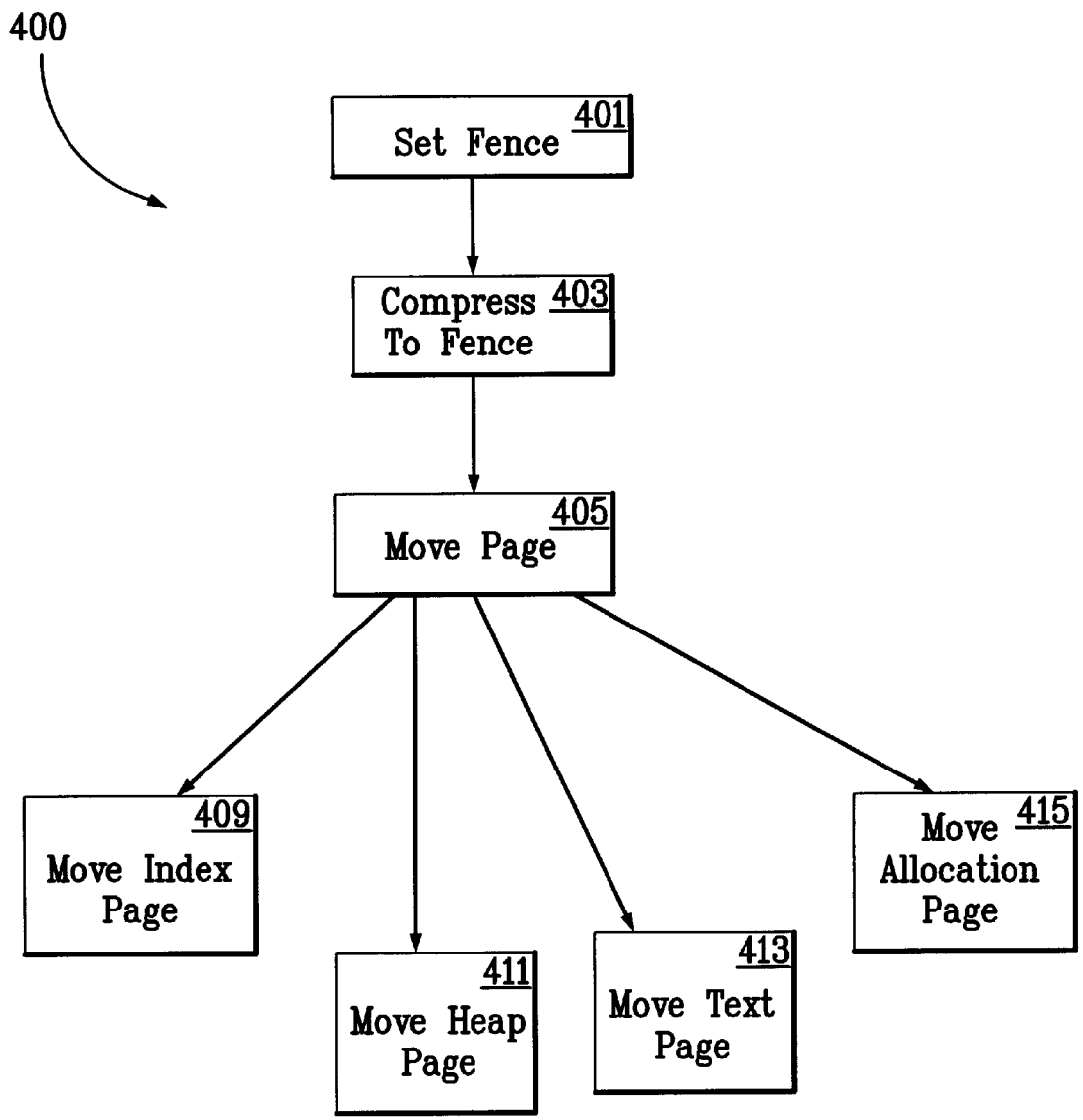
FIG. 4 is a block diagram of software modules used in an exemplary implementation of the invention.

The shrink facility in SEQ Server 7.0 comprises a series of software modules or components illustrated in FIG. 4 and described next. The description of data that is logged is also provided where required. All page/extent allocations and deallocations are performed as a user transaction to allow rollbacks on deadlock.

Set Fence Module 401

If the user has not specified a specific file size, the shrink facility estimates the target size of the file by scanning the allocation maps (GAM, SGAM, and PFS) to determine the number of used and free pages in the file. Each uniform extent is counted as eight used pages. For mixed extents, the actual number of used and free pages are added to their respective counts. The shrink facility then calculates the target size based on the number of used pages and a predetermined number of required free pages. If the estimated target size of the file is less than the original file size, the original file size is used. Note that using the original file size means that the shrink facility undoes all the autogrow operations performed on the file.

If the user has specified a file size, it is used as the target size. The internal file structure (file control block or FCB) is marked with an allocation size fence corresponding to the target size. The address of the fence is passed to the "compress to fence" module.

The SEQ Server 7.0 exemplary embodiment of the shrink facility also shrinks log records but does not use an immediate shrink mechanism. The target shrink size is determined for each log file as either an explicit requested size provided by a user, or on a size calculated by a background process based on the past usage of the log. For example, in the exemplary embodiment, the background process calculates the maximum amount of log space used in the last one-half hour interval as the target size of the log.

Instead of actually attempting to move the log records, the shrink facility sets an allocation fence in each log file equal to the target size of the file. As is the case with data files, all new allocations in the log file are obtained from portions of the file below the allocation fence, unless the amount of space available below the fence is insufficient. The fence is moved up if there is not enough space to hold new log data. As user activity continues to generate log records and old log records are deallocated because they are not being used by the system, the portions of the files above the allocation fence become free. Each activity which deallocates log records, such as checkpoint, log truncation and log backup, examines the logical log files individually. If some portion at the tail of the file beyond the allocation fence is not in use, that portion is deleted from the file. Thus, over a period of time with user activity, the log automatically shrinks to the size desired.

Compress to Fence Module 403

This module scans the file from tail to fence and causes the data in the pages in the file above the fence to be moved to pages below the fence. The first free page in a mixed extent below the fence is used as the destination page for data on a page in a mixed extent above the fence. Any free page in a uniform extent below the fence is used for data in an extent above the fence that belongs to the same object. If no such free page exists, then a free extent below the fence is allocated to the object. A call to the Move Page module is used to move the data to the destination page. Any linkages are updated by a call to the Update Index module after the Move Page module returns.

In the case where the file is full, the allocation manager can move the fence to increase the size of the file, or can allocate space in a related file in the same filegroup. The choice is controlled through a mode specification in the shrink facility.

Move Page Module 405

The Move Page module is called with the address of the page to be moved (the "old page") and the destination page (the "new page"). The Move Page module calls specific modules to move the data, depending on the type of page.

Move Index Page Module 409

Clustered indexes use the logical RID to access the record. So index pages are moved in the same manner as a normal page split in SQL except that no new entry is created in the parent node. Also, no secondary indexes need be updated. The process is as follows:

Allocate new page
Latch new page
Latch parent
Latch old page
Probe locks to make sure no locks are held on the page
Move data to new page
Update links on sibling pages
Update new page address in parent slot
Release latches In one embodiment, the allocation of the new page, the format header, the data on the page, the pointers in the parent and sibling nodes, and the deallocation of the current page are recorded in the log file. In an alternate embodiment, only the movement of the data from the current to the new page is recorded.

Move Heap Page Module 411

Indexes for heap data use the physical RID of the record as a unique value in the keys and as the pointer from the lowest level of the index into the heap. In addition, forwarded records use the RID as a pointer and backpointer. In the exemplary embodiment, if the size of a heap record expands when it is updated, such as when a variable length column increases in size, and there is not enough space left on the page to fit the larger record, the record is forwarded. The data for the record is inserted on a new page as a forwarded record, which is a normal record that contains an extra control field that is a backpointer to the original RID. The original record is then converted to a forwarding stub, which is a record that just contains the pointer to the data that was moved to the other page. The use of forwarded records means that updates do not have to update the secondary indexes on the record to point to the new location.

In one embodiment, the process to move a heap page is as follows:

Lock page to be moved exclusively
For each record on the page:
    Read the record:
        If a forwarding record (stub): get the data from the forwarded page.
        If a forwarded record: extract the RID of the forwarding stub
    Delete the record using an internal delete call.
    Insert the record using an internal insert call.
All index updates are handled by the insert and delete calls.

An alternate embodiment uses standard SQL query processor commands. This embodiment allows the query processor to optimize updates to the indexes.

Latch the page
Extract the RID for all the records on the page
If the record is a forwarded record use the RID of the forwarding stub.
Issue a SQL command:
    Update <table> set c1=c1 where <special RID pseudo column> in (<RID list
    from above>) with (<special hint to do update by delete/insert>).

The allocation of the new page, format header, data movement, all binary tree updates, back and forward links of forwarded/forwarding records and deallocation of old page are logged.

Move Text Page Module 413

Text pointers in the parent nodes contain the physical RID of the binary large object ("blobs") that are the text data. Without back links from the text nodes to the parent's rows all nodes must be found from the top down.

Scan the base table
If a record has a text pointer:
    Scan data records looking for text pointers
    If a pointer is found:
        Search all parent nodes of the text index structure.
        If a child pointer points to a page above the fence
            Delete the child record
            Insert the child record
            Update the parent record.

If the root of the text index structure needs to be moved, it is moved and the data record is updated to point to the new root record.

The allocation of the new page, data movement, changed link in parent node, and deallocation of old page are logged.

Move Allocation Page Module 415

The GAM, SGAM and PFS pages are fixed location pages and are not be moved but the IAM pages can be moved. IAMs have next and prior linkages and if a page is the first IAM in the chain, the pointer to the IAM page in the system index table (sysindex) must be updated with the new value.

Exclusively lock IAM's owning table
Allocate new page
Latch old and new pages
Copy old data to new page
Read and latch prior page, update next pointer
Read and latch next page, update prior pointer
If first in chain,
    Search sysindex for a root or first IAM page pointer that points to the old page
    Update sysindex root or first IAM entry with the new page identifier.

The allocation of the new page, format header, data movement, linkages on next and previous page, and the sysindex row update for new IAM page if needed are recorded in the log file.

Embodiments of a shrink facility as implemented in SEQ Server 7.0 have been described in this section. The supporting functions provided by SQL Server, such as file organization, locking/latching, and recovery, have been described in conjunction with a particular arrangement of software modules designed to implement the shrink facility. It will be readily apparent to one of skill in the art that alternate embodiments which arrange the software modules differently are equally functional, and such alternate embodiments are considered within the scope of the invention.

Conclusion

A dynamic on-line shrink facility has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the shrink facility is applicable in any file system which allows files to grow above their originally created value, whether those files are database files or flat files. Furthermore, those of ordinary skill within the art will appreciate the invention is not restricted to only files that allocate logical units as pages or sets of pages. Finally, although various embodiments of the invention have been described as operating with a separate component which actually manages the access to the file, it will be immediately apparent to one skilled in the art that the requires functions can be allocated differently among similar components.

The terminology used in this application with respect to is meant to include all of these operating environments. Therefore, it is manifestly intended that this invention be limited only by the following claims and equivalents thereof.

We claim:

1. A computerized method for shrinking a file that is subdivided into allocation units comprising:
   determining a target size for the file;
   setting an allocation fence address for the file, wherein the allocation fence address corresponds to the target size;
   moving data stored in each allocation unit above the fence address to an allocation unit below the fence address; and
   deleting the allocation units above the fence address.

2. The computerized method of claim 1, wherein determining the target size comprises:
   estimating the target size based on a number of allocation units having data stored therein;
   comparing the estimated target size to an original size for the file when it was created; and
   setting the target size to the greater of the estimated target size and the original size.

3. The computerized method of claim 2, wherein the estimated target size is further based on a number of allocation units having no data stored therein.

4. The computerized method of claim 1, further comprising:
   scanning the allocation units above the fence address when all the data have been moved to allocation units below the fence; and
   moving any new data stored in an allocation unit above the fence to an allocation unit above the fence.

5. The computerized method of claim 1, wherein moving the data comprises:
   examining each allocation unit above the fence starting at a tail of the file and terminating when the fence address is reached.

6. The computerized method of claim 1, wherein the data on an allocation unit is one of a plurality of data types and the data is moved based on the type.

7. The computerized method of claim 6, further comprising:
   if the type of the data is heap data,
      deleting the data;
      reinserting the deleted data; and
      dellocating the allocation unit above the page.

8. The computerized method of claim 6, further comprising:
   if the type of the data is clustered data,
      extracting a cluster key from the data;
      searching a key structure to find a lowest parent for the data based on the cluster key;
      moving the data below the fence;
      updating links to the lowest parent; and
      deallocating the allocation unit above the fence.

9. The computerized method of claim 6, further comprising:
   if the type of the data is text data,
      deleting the data on each allocation unit above the fence that contains related text data; and
      reinserting the deleted data.

10. The computerized method of claim 6, further comprising:
    if the type of the data is intermediate index node data,
       extracting an index key from the data;
       searching a key structure to find a lowest parent for the data based on the index key;
       moving the data below the fence;
       updating links to the lowest parent; and
       deallocating the allocation unit above the fence.

11. The computerize method of claim 6, further comprising:
    if the type of the data is root index node data,
       moving the data on each allocation unit above the fence that contains related root index node data.

12. The computerized method of claim 6, further comprising:
    if the type of the data is logical log data,
       moving the data and deleting the allocation units in a deferred manner.

13. The computerized method of claim 12, wherein determining the target size comprises:
    calculating an amount of space used during a set time period as the target size.

14. The computerize method of claim 1, further comprising:
    securing exclusive use of the data before moving the data; and
    releasing the data from exclusive use after moving the data.

15. A computer-readable medium having computer-executable modules comprising:
    a set fence module that places an allocation fence in a file;
    a compress to fence module that scans the file from a tail end until the fence; and
    a move page module that moves data in the file above the fence to below the fence when the compress to fence module finds data above the fence.

16. The computer-readable medium of claim 15, further comprising a plurality of move modules specific to a type of data that are invoked by the move page module when a corresponding data type is found by the compress to fence module.

17. The computer-readable medium of claim 15, wherein the plurality of move modules comprise:
    a move index page module that moves index data below the fence;
    a move head page module that moves heap data below the fence;
    a move text page module that moves text data below the fence; and
    a move allocation page module that move allocation data below the fence.

18. A computerized system comprising:
    a processing unit;
    a system memory coupled to the processing unit through a system bus;
    a computer-readable medium coupled to the processing unit through a system bus; and
    a shrink facility executed from the computer-readable medium by the processing unit, wherein the shrink facility causes the processing unit to place an allocation fence in a file, scan the file from a tail end to the allocation fence, move data found in the file allocation units above the fence to file allocation units below the fence, and delete the file allocation units above the fence.

19. The computerized system of claim 18, flirther comprising:
a file allocation manager executed from the computer-readable by the processing unit, wherein the file allocation manager is coupled to the shrink facility and is responsive to the allocation fence being placed in the file.

20. The computerized system of claim 19, wherein the shrink facility invokes the file allocation unit to cause the processing unit to allocate appropriate new allocation units in the file below the fence.

21. The computerized system of 19, wherein the file allocation manager causes the processing unit to move the allocation fence toward the tail of the file when data to be stored in the file cannot fit below the fence.

* * * * *

UNITED STATES PATENT AND TRADEMARK OFFICE
CERTIFICATE OF CORRECTION

PATENT NO. : 6,249,792 B1  
DATED : June 19, 2001  
INVENTOR(S) : Michael Zwilling et al.

It is certified that error appears in the above-identified patent and that said Letters Patent is hereby corrected as shown below:

Column 1,  
Line 45, after "users" a period -- . -- is missing.

Column 10,  
Line 7, "SEQ" should be -- SQL --; and after "described" "SEQ" should be -- SQL --.  
Lines 12, 43, 53, "SEQ" should be -- SQL --.

Column 11,  
Lines 28 and 57, "SEQ" should be -- SQL --.

Column 12,  
Line 15, "SEQ" should be -- SQL --.

Column 14,  
Line 21, "LAM" should be -- IAM --;  
Line 23, "LAM's" should be -- IAM'S --.

Column 15,  
Line 3, "requires" should be -- required --.

Column 16,  
Line 27, "computerize" should be -- computerized --

Column 17,  
Line 4, "flirther" should be -- further --

Signed and Sealed this

Fifteenth Day of January, 2002

*Attest:*

*Attesting Officer*

JAMES E. ROGAN  
*Director of the United States Patent and Trademark Office*